(12) United States Patent
Zafar et al.

(10) Patent No.: US 7,142,646 B2
(45) Date of Patent: Nov. 28, 2006

(54) VOICE MAIL INTEGRATION WITH INSTANT MESSENGER

(75) Inventors: Shadman Zafar, Irving, TX (US);
Ashequs Samad, Irving, TX (US);
Kevin Trottier, Dallas, TX (US);
Mahesh Rajagopalan, Irving, TX (US)

(73) Assignee: Verizon Data Services Inc., Irving, TX (US)

( * ) Notice: Subject to any disclaimer, the term of this patent is extended or adjusted under 35 U.S.C. 154(b) by 287 days.

(21) Appl. No.: 10/083,792

(22) Filed: Feb. 27, 2002

(65) Prior Publication Data

US 2004/0076272 A1 Apr. 22, 2004

Related U.S. Application Data

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,719, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001.

(51) Int. Cl.
*H04M 1/64* (2006.01)

(52) U.S. Cl. .............. 379/88.17; 455/412.2; 455/413; 455/414.4; 379/88.11; 379/88.12; 379/230

(58) Field of Classification Search .......... 709/207, 709/204, 202; 370/389, 420; 455/413, 414.1, 455/412, 556; 713/153; 379/211.01
See application file for complete search history.

(56) References Cited

U.S. PATENT DOCUMENTS

| | | | |
|---|---|---|---|
| 4,540,850 A | 9/1985 | Herr et al. |
| 5,327,486 A | 7/1994 | Wolff et al. |
| 5,440,624 A | 8/1995 | Schoof |
| 5,631,904 A | 5/1997 | Fitser et al. |
| 5,652,789 A | 7/1997 | Miner et al. |
| 5,724,412 A | 3/1998 | Srinivasan |
| 5,872,841 A | 2/1999 | King et al. |
| 5,875,242 A | 2/1999 | Glaser et al. |
| 5,903,845 A | 5/1999 | Buhrmann et al. |

(Continued)

FOREIGN PATENT DOCUMENTS

EP 0818908 A3 1/1995

(Continued)

OTHER PUBLICATIONS eVoice, Voice-ASP White Paper, Voicemail—Technology & Processes, Dec. 13, 2000, pp. 1-7.

(Continued)

*Primary Examiner*—Fan Tsang
*Assistant Examiner*—Lisa Hashem
(74) *Attorney, Agent, or Firm*—Leonard C. Suchyta, Esq.; Joseph R. Palmieri, Esq.; Finnegan, Henderson, Farabow, Garret & Dunner LLP

(57) ABSTRACT

A method for providing a message to a called party through a network comprised of both a telephone network and a data network, and at least one gateway device connected to both the telephone network and the data network. The method performed by the gateway device includes receiving, through the telephone network, signaling information representing a message from a calling party to a called party and providing the message to the called party via the data network by displaying an instant message containing a notification of the message on a display device visible to the called party.

15 Claims, 19 Drawing Sheets

U.S. PATENT DOCUMENTS

| | | | |
|---|---|---|---|
| 5,907,547 | A | 5/1999 | Foladare et al. |
| 6,061,432 | A * | 5/2000 | Wallace et al. .......... 379/88.18 |
| 6,192,123 | B1 | 2/2001 | Grunsted et al. |
| 6,219,413 | B1 | 4/2001 | Burg |
| 6,226,374 | B1 | 5/2001 | Howell et al. |
| 6,301,609 | B1 * | 10/2001 | Aravamudan et al. ...... 709/207 |
| 6,310,947 | B1 | 10/2001 | Polcyn |
| 6,351,279 | B1 | 2/2002 | Sawyer |
| 6,371,484 | B1 | 4/2002 | Yuan |
| 6,411,605 | B1 | 6/2002 | Vance et al. |
| 6,430,289 | B1 | 8/2002 | Liffick |
| 6,442,245 | B1 | 8/2002 | Castagna et al. |
| 6,459,780 | B1 | 10/2002 | Wurster et al. |
| 6,463,145 | B1 | 10/2002 | O'Neal et al. |
| 6,470,079 | B1 | 10/2002 | Benson |
| 6,477,374 | B1 | 11/2002 | Shaffer et al. |
| 6,480,830 | B1 | 11/2002 | Ford et al. |
| 6,519,326 | B1 | 2/2003 | Milewski et al. |
| 6,535,596 | B1 | 3/2003 | Frey et al. |
| 6,546,005 | B1 | 4/2003 | Berkley et al. |
| 6,563,914 | B1 | 5/2003 | Sammon et al. |
| 6,564,261 | B1 | 5/2003 | Gudjonsson et al. |
| 6,577,622 | B1 | 6/2003 | Schuster et al. |
| 6,584,122 | B1 | 6/2003 | Matthews et al. |
| 6,614,786 | B1 | 9/2003 | Byers |
| 6,625,258 | B1 | 9/2003 | Ram et al. |
| 6,717,938 | B1 | 4/2004 | D'Angelo |
| 6,735,292 | B1 | 5/2004 | Johnson |
| 6,771,949 | B1 * | 8/2004 | Corliss ...................... 455/413 |
| 2001/0003202 | A1 * | 6/2001 | Mache et al. ................ 713/153 |
| 2001/0014863 | A1 | 8/2001 | Williams III |
| 2002/0012425 | A1 | 1/2002 | Brisebois et al. |
| 2002/0055351 | A1 | 5/2002 | Elsey et al. |
| 2002/0069060 | A1 * | 6/2002 | Cannavo et al. ............ 704/257 |
| 2002/0076026 | A1 | 6/2002 | Batten |
| 2002/0076027 | A1 * | 6/2002 | Bernnan et al. ....... 379/211.01 |
| 2002/0077082 | A1 * | 6/2002 | Cruickshank ............... 455/413 |
| 2002/0080942 | A1 | 6/2002 | Clapper |
| 2002/0083462 | A1 | 6/2002 | Arnott |
| 2002/0110121 | A1 * | 8/2002 | Mishra ....................... 370/389 |
| 2002/0147777 | A1 | 10/2002 | Hackbarth et al. |
| 2002/0147811 | A1 | 10/2002 | Schwartz et al. |
| 2003/0014488 | A1 | 1/2003 | Dalel et al. |
| 2003/0058838 | A1 | 3/2003 | Wengrovitz |
| 2003/0169330 | A1 | 9/2003 | Ben-Shachar et al. |
| 2004/0019638 | A1 | 1/2004 | Makagon et al. |
| 2004/0034700 | A1 | 2/2004 | Polcyn |
| 2004/0044658 | A1 | 3/2004 | Crabtree et al. |
| 2004/0249884 | A1 | 12/2004 | Caspi et al. |

FOREIGN PATENT DOCUMENTS

| | | |
|---|---|---|
| JP | 59-169264 | 9/1984 |
| JP | 2000-270307 | 9/2000 |
| WO | WO 01/11586 A1 | 2/2001 |

OTHER PUBLICATIONS eVoice, "Voice-ASP, White Paper Technology & Processes", Dec. 13, 2000.* eVoice, "Voice-ASP, White Paper: Market Opportunities for Enhanced Voicemail", Nov. 10, 2000.*

"MP3 Recorder Download - MP3 Recorder - Record Audio Stream to MP3 or WAV," 2002, http://www.mp3-recorder.net.

"F.AQ Premium Home Answer" eVoice, http://content.evoice.com/wcs/signUp/FAQ_premHA_s01.htm.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(Oct. 20, 2002).htm.

"Macromedia SoundEdit 16 Support Center-Working with Other Programs, What is Shockwave Audio Streaming?" http://www.macromedia.com/support/soundedit/how/shock/whatis.html.

"Chapter 3: Overview," last updated Dec. 2, 1999, http://service.real.com/help/library/guides/g270/htmfiles/overview.htm.

"How Internet Radio Works," Howstuffworks, http://computer.howstuffworks.com/internet-radio.htm/printable.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.org/editions/synch_collab.asp.

"NetMeeting101," http://www.meetingbywire.com/NetMeeting101.htm.

"NetMeeting102," http://www.meetingbywire.com/NetMeeting102.htm.

"Instructions on Application Sharing and Data Collaboration, " VCON Escort and Cruiser, http://www.vide.gatech.edu/docs/share/.

"Instructions on Multipoint Application Sharing and Data Collaboration," VCON Escort and Cruiser with the RadVision MCU, http://www.vide.gatech.edu/docs/multi-share/.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone - The 'Dial Tone' for Web Communications Services," Webex, 2003.

Business Solutions/Professional, http://www.accessline.com/business_sol/bs_professional_body.html.

"Accessline Comms' Accessline Service, The One-Number Wonder," CommWeb, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies,"Privacy Corps - Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, Apr. 2003.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers,", Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000,http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the intergration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology, "MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers, " Data Connection Ltd, 1998-2005, http://www.dataconnection.com/conferencing.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

* cited by examiner

| Time 520 | Date 522 | Caller ID 524 | Audio File 526 |
|---|---|---|---|
| 10:55 PM | 02.09.01 | Brian Roberts | voice1.wav |
| 09:32 AM | 02.15.01 | John Smith | voice2.wav |
| | | | |

VOICE MAIL INTEGRATION WITH INSTANT MESSENGER

RELATED APPLICATIONS

Applicants claim the right to priority under 35 U.S.C, § 119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. patent application Ser. No. 10/083,884, entitled "DEVICE INDEPENDENT CALLER ID," U.S. patent application Ser. No. 10/083,822, entitled "METHOD AND APPARATUS FOR A UNIFIED COMMUNICATION MANAGEMENT VIA INSTANT MESSAGING,"; U.S. patent application Ser. No. 10/084,390, entitled "METHOD AND APPARATUS FOR CONTEXT BASED QUERYING,"; U.S. patent application Ser. No. 10/083,793, entitled "METHOD AND APPARATUS FOR CALENDARED COMMUNICATIONS FLOW CONTROL,"; U.S. patent application Ser. No. 10/084,121, entitled "CALENDAR-BASED CALLING AGENTS,"; U.S. patent application Ser. No. 10/083,798, entitled "METHOD AND APPARATUS FOR INTEGRATED BILLING VIA PDA,"; and U.S. patent application Ser. No. 10/084,002, entitled "METHOD AND APPARATUS FOR DIAL STREAM ANALYSIS,", and all of which are expressly incorporated herein by reference in their entirety.

FIELD OF THE INVENTION

The present invention relates to systems and methods for controlling telephony systems using data processing systems and, more particularly, to the use of instant messaging to provide information relating to voice mail.

BACKGROUND OF THE INVENTION

When a telephone call is initiated, one person, customarily referred to as a "calling party," causes a connection to be made to the telephone of a second person or the "called party." When the called party is not available, the calling party can leave a message for the called party. This message may be in the form of voice mail.

Unified messaging service providers such as uReach™, Onebox™, and Portico™, available at www.ureach.com, www.onebox.com, and www.portico.net, respectively, offer services that include providing web-based access to voice mail. The uReach™ service also provides for a pager alert when a voice mail is received. However, known unified messaging services suffer from two significant limitations. The unified messaging services require a user to acquire an additional telephone number, rather than using a traditional telephone-service customer's existing telephone number. Additionally, none of the known unified messaging systems have the ability to provide information about voice mail via an instant messaging system.

According to its website at www.evoice.com, eVoice, Inc. of Menlo Park, Calif. offers services including voice mail. In a white paper entitled, "Voicemail-Market Opportunities," eVoice describes a voice mail system that accepts calls that have been forwarded due to a busy condition or the non-occurrence of an answer event. Known systems, such as that described by eVoice provides an Internet Call Waiting ("ICW") service that alerts a user to the occurrence of a call event when the user is currently using the user's telephone line for dial-up Internet access. The eVoice white paper also describes Internet service providers ("ISP") and the use of instant messaging. The white paper states "eVoice enhanced messaging, IM and Internet Call Waiting capabilities can provide a compelling product for these ISPs and portals which should allow them to bypass the local phone companies."

Therefore, there is a need in the art for providing voice mail alerts from within a voice network via instant messaging on a data network without the need for additional add-on services, such as eVoice.

SUMMARY OF THE INVENTION

In accordance with the invention, as embodied and broadly described herein, the invention provides for processing voice mail in a network.

An embodiment consistent with the principles of the present invention provides a method for providing a message from a calling party to a called party through a network comprised of both a telephone network and a data network, and at least one gateway device connected to both the telephone network and the data network. The method performed by the gateway device includes receiving a message identifying a calling party requesting a call in the voice network to a called party and providing the message to the called party via the data network by displaying an instant message containing a notification of the message on a display device visible to the called party.

In accordance with another embodiment consistent with the principles of the present invention there is provided a method of receiving voice mail and providing voice mail received information to a voice-mailbox owner by way of a voice mail gateway in which a calling party places a telephone call by transmitting signaling information corresponding to a telephone number, and the calling party leaves a voice mail message. The method comprises: registering the voice mailbox owner using an instant messaging server; receiving from the calling party the signaling information corresponding to the telephone number; receiving from the calling party the voice mail message; storing the voice mail message in a voice mail storage memory; generating a voice mail alert message corresponding to the voice mail message; transmitting the voice mail alert message to an instant messaging server; and causing a user terminal of the voice-mailbox owner to display an instant message indicating that the voice mail message has been received.

In accordance with another embodiment consistent with the principles of the present invention a method for providing voice mail indication to a user in a system comprising a data network and a telephone network comprises: receiving via the telephone network a voice mail for a user; and storing the voice mail in a database accessible by the data network.

In accordance with another embodiment consistent with the principles of the present invention a system comprises: a telephone network for receiving a voice message from a calling party; a data network for providing indication of a voice message from a calling party; a gateway device, connected to both the telephone network and the data network, for receiving, via the telephone network, signaling information representing the voice message from a calling party to a called party and providing the voice message to the called party via the data network.

In accordance with another embodiment consistent with the principles of the present invention an apparatus comprises: a telephone network; a first transmitter connected to the telephone network; a data network; a second transmitter connected to the data network; a gateway connected to both the first transmitter and the second transmitter, the gateway being capable of providing notification of a message to a called party by causing display of an instant message containing the notification of the message on a display device visible to the called party.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and, together with the description, serve to explain the principles of the invention.

FIGS. 3a–3m are exemplary screen shots of user interfaces in accordance with methods and apparatus consistent with the principles of the present invention;

FIG. 5 is a data structure used for voice mail notification, in accordance with methods and apparatus consistent with the principles of the present invention;

DESCRIPTION OF THE EMBODIMENTS

In accordance with the principles of the present invention, information indicating a voice mail from a telephone network, is provided to a called party via a data network using a unified communications service. The unified communications service receives, from the telephone network, information representing a voice mail intended for a called party. The unified communications service then provides the voice mail information to the called party via the data network.

Reference will now be made in detail to exemplary embodiments of the present invention, examples of which are illustrated in the accompanying drawings. Wherever possible, the same reference numbers will be used throughout the drawings to refer to the same or like parts.

Figure 1:
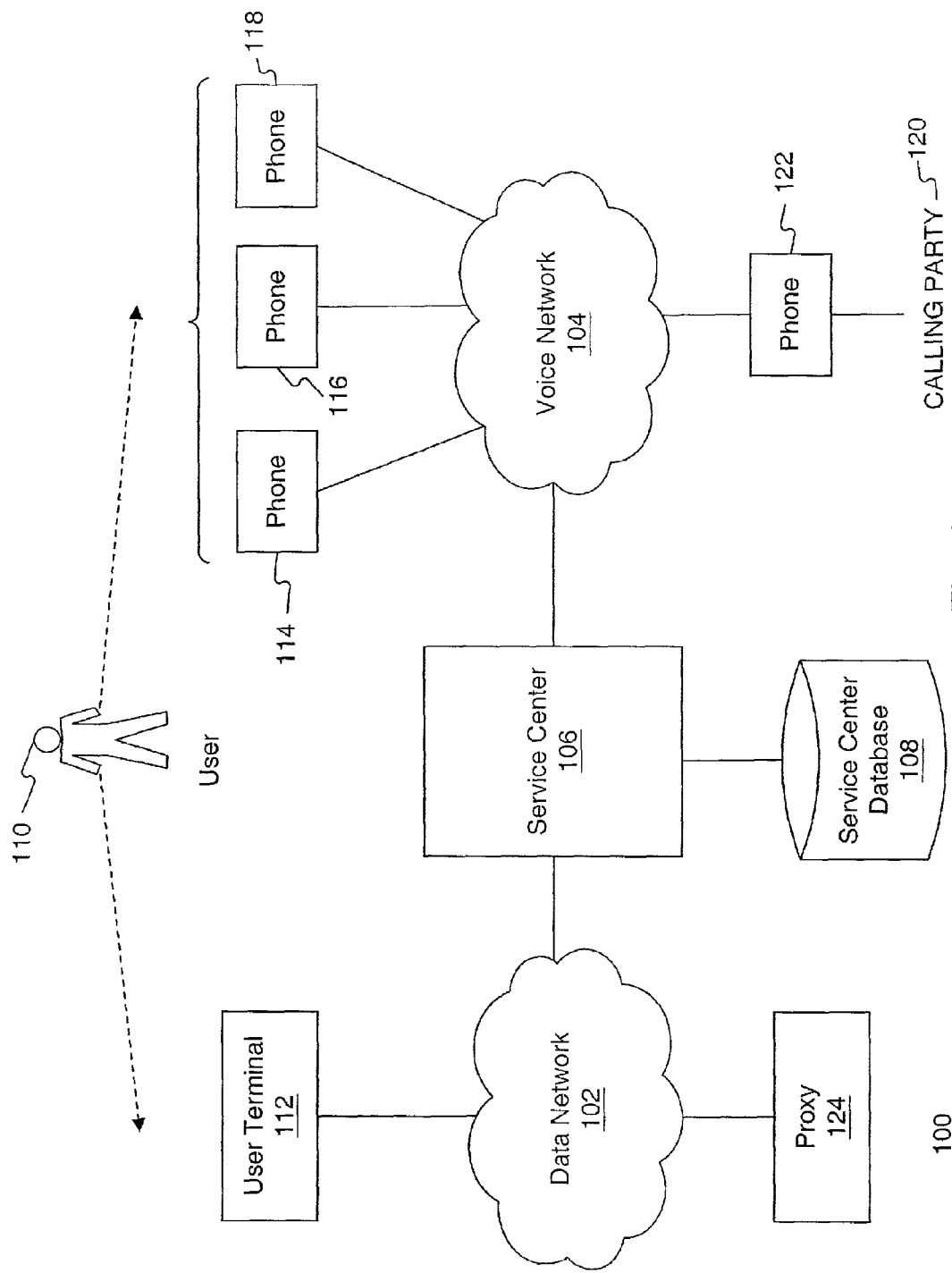
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a user terminal 112 to interface data network 102. In addition, user 110 may use phones 114, 116, and 118 to interface with voice network 104. For example, calling party 120 may use phone 122 to call user 110 at any one of phones 114,116, and 118.

Data network 102 provides communications between the various entities depicted in environment 100 of FIG. 1, such as user terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including, an identifier for user 110, a password, one or more email addresses for user 110, one or more instant messaging identifiers for user 110, and one or more telephone numbers, such as for phones 114, 116, and 118. Additionally, service center database 108 may contain configuration information that indicate rules for how and when communications are forwarded, such as telephone calls over voice network 104. Service center database 108 may be implemented as an Oracle™ database using a combination of known hardware and software, such as Proliant™ servers and EMC storage devices.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. Although there is no accepted universal IM standard, an appropriate IM model may be found in RFC 2778, M. Day et al., The Internet Society (2000), titled "A Model for Presence and Instant Messaging," which describes, inter alia, a model for providing instant messaging services. There are several known IM systems including America OnLine Instant Messenger ("AIM") and Microsoft Network Messenger Service ("MSNMS"). In addition to IM services, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

User terminal 112 may communicate directly with service center 106. For example, a client application may be installed on user terminal 112, which directly communicates with service center 106. Alternatively, user terminal 112 may communicate with service center 106 via proxy 124. User terminal 112 is described in further detail with reference to FIG. 2.

Proxy 124 provides an intermediate communications service for user terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL"). Proxy 124 may then establish an SSL session with service 106 and provide the information from user 110.

Phones 114, 116, 118, and 122 interface voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
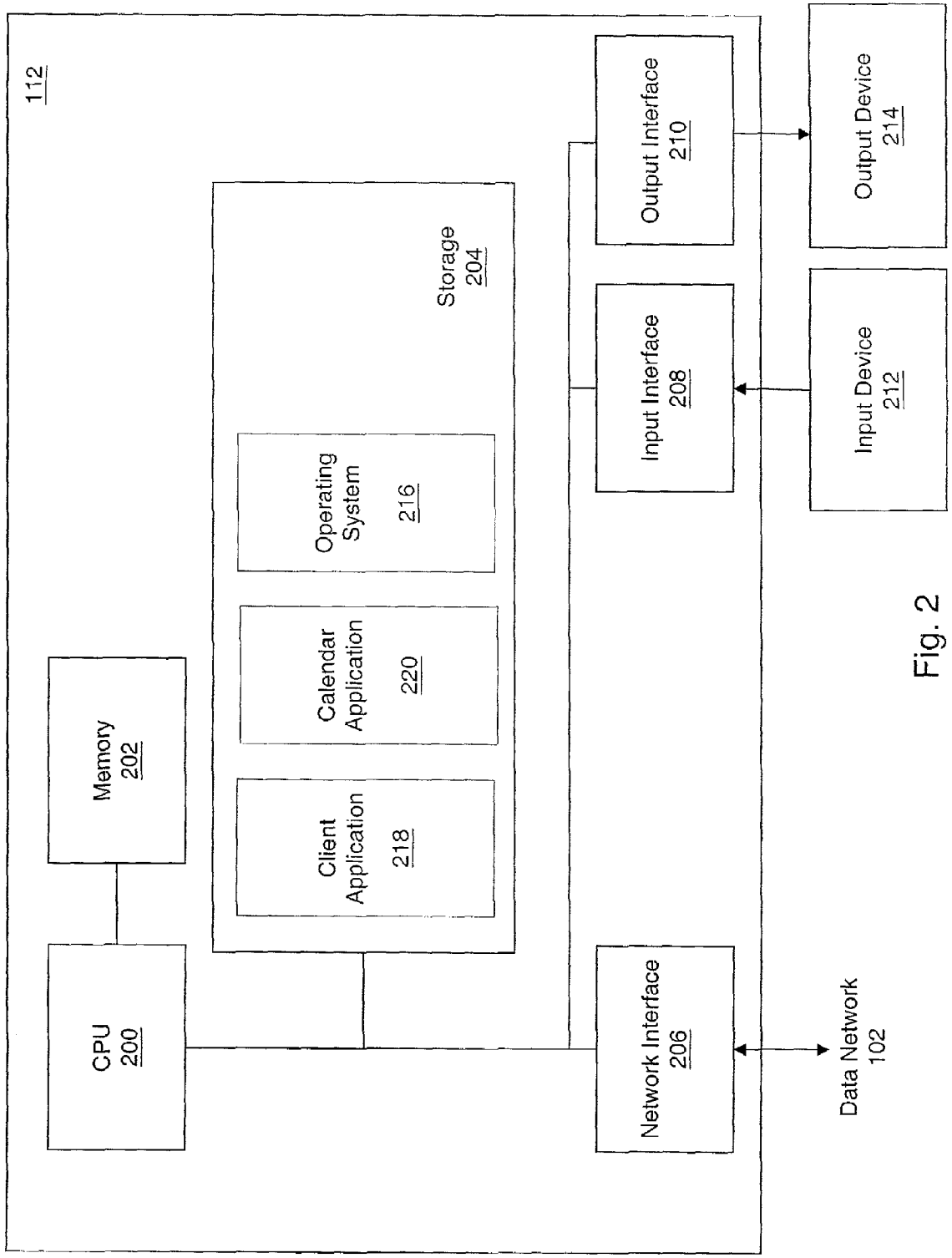
FIG. 2 is a block diagram of a user terminal, in accordance with methods and apparatus consistent with the principles of the present invention.

FIG. 2 is a block diagram of a user terminal, in accordance with methods and apparatus consistent with the principles of the present invention. As shown, user terminal 112 includes a central processing unit (CPU) 200, a memory 202, a storage module 204, a network interface 206, an input interface 208, an output interface 210, an input device 212, and an output device 214.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when user terminal 112 executes an application installed in storage module 204, CPU 200 may download at least a portion of the program code from storage module 204 into memory 308. As CPU 200 executes the program code, CPU 200 may also retrieve additional portions of program code from storage module 204.

Storage module 204 provides mass storage for user terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 includes program code for a calendar application 220, such as GroupWise provided by Novell Corporation, or Outlook provided by Microsoft Corporation; a client application 218, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3A:
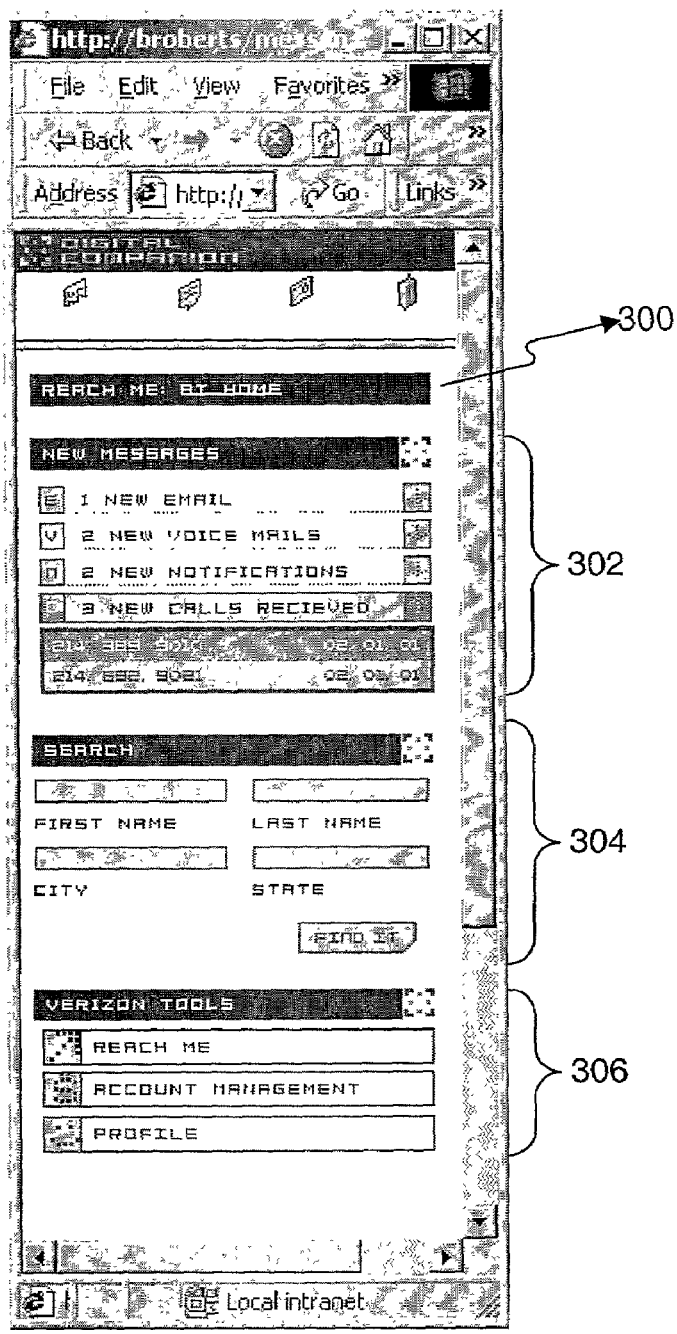

FIGS. 3a–3m illustrate exemplary screen shots of user interfaces to implement voice mail integration with instant messenger. As shown in FIG. 3a, the screen shot provides a current location portion 300 for indicating that communications should be directed to the "AT HOME" location. Current location 300 may also indicate other locations, such as, for example, "AT WORK", "IN CAR", and "ON TRAVEL." Such locations can be based on predetermined choices or user configurable choices. The screen shot also provides a new message portion 302 that lists the number and type of new messages. In particular, new message portion 302 shows that there is "1 New EMAIL", "2 NEW VOICE MAILS", "2 NEW NOTIFICATIONS", and "3

NEW CALLS RECEIVED". New message portion 302 can also provide the last phone numbers dialed and the date they were dialed.

The screen shot also provides a search portion 304 that allows a user to search for contact information regarding a particular person. For example, search portion 304 provides "FIRST NAME", "LAST NAME", "CITY", and "STATE" search inputs to find contact information of a particular person. The screen shot also provides a tools portion 306 that gives a user options to modify various aspects of the communications service. These options may include "REACH ME", "ACCOUNT MANAGEMENT", and "PROFILE" options. The "REACH ME" option allows a user to change where a user is to be contacted shown in the current location portion 300. The "ACCOUNT MANAGEMENT" option allows a user to modify information such as billing information associated with a called party. The "PROFILE" option allows a user to modify how communications are forwarded.

Figure 3B:
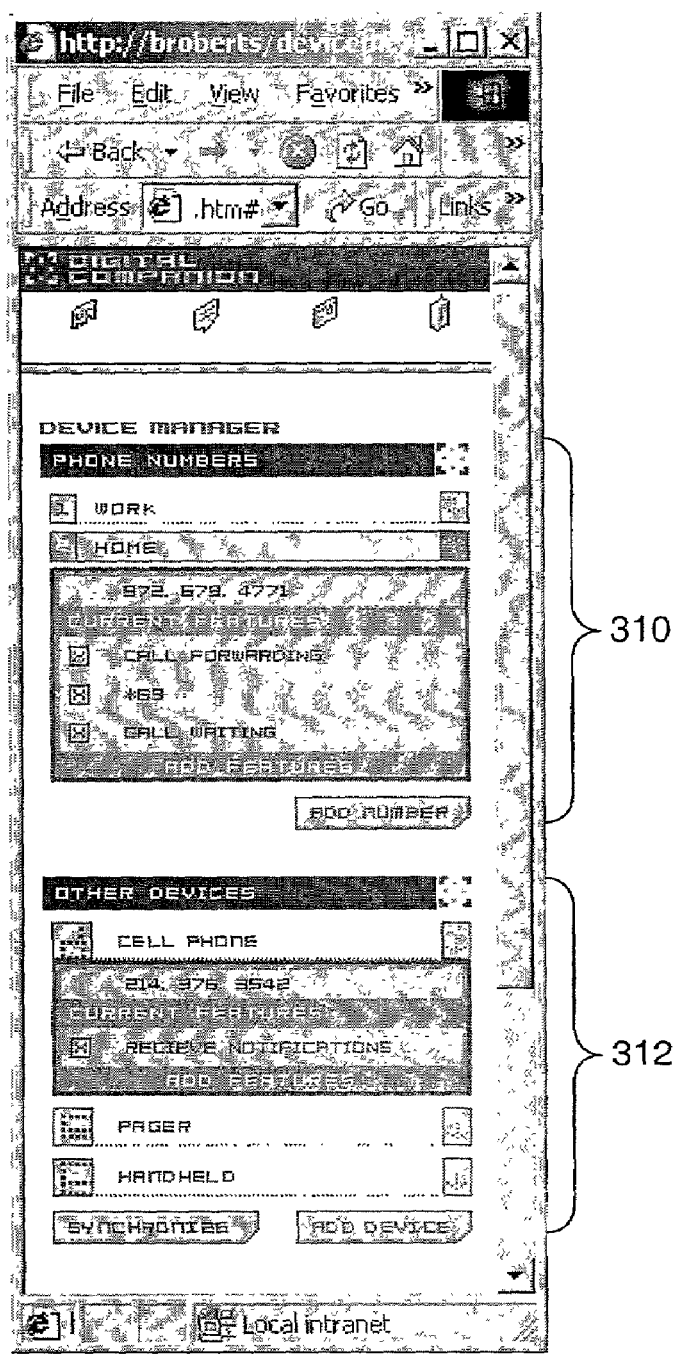

As shown in FIG. 3b, the screen shot shows a user interface for a device manager. The screen shot shows a device manager portion 310 that allows a user to view and to change phone number settings. For example, the user can change at "WORK" and "AT HOME" phone number settings. Device manage portion 310 also provides a "CURRENT FEATURES" option that lists features being used. Such features include "CALL FORWARDING", "69", and "CALL WAITING". The user also has the option to "ADD FEATURES" or "ADD NUMBERS". The screen shot also provides a other devices portion 312 that allows a user to manage devices which are not associated with a particular location. Other devices portion 310 lists "CELL PHONE", "PAGER", and "HANDHELD" devices as other devices in which a user can manage. For each device, a user can view the number for the other device and associated "CURRENT FEATURES" for the other device. Other devices portion 310 also provides a "SYNCHRONIZE" option and "ADD DEVICE" option for the user.

Figure 3C:
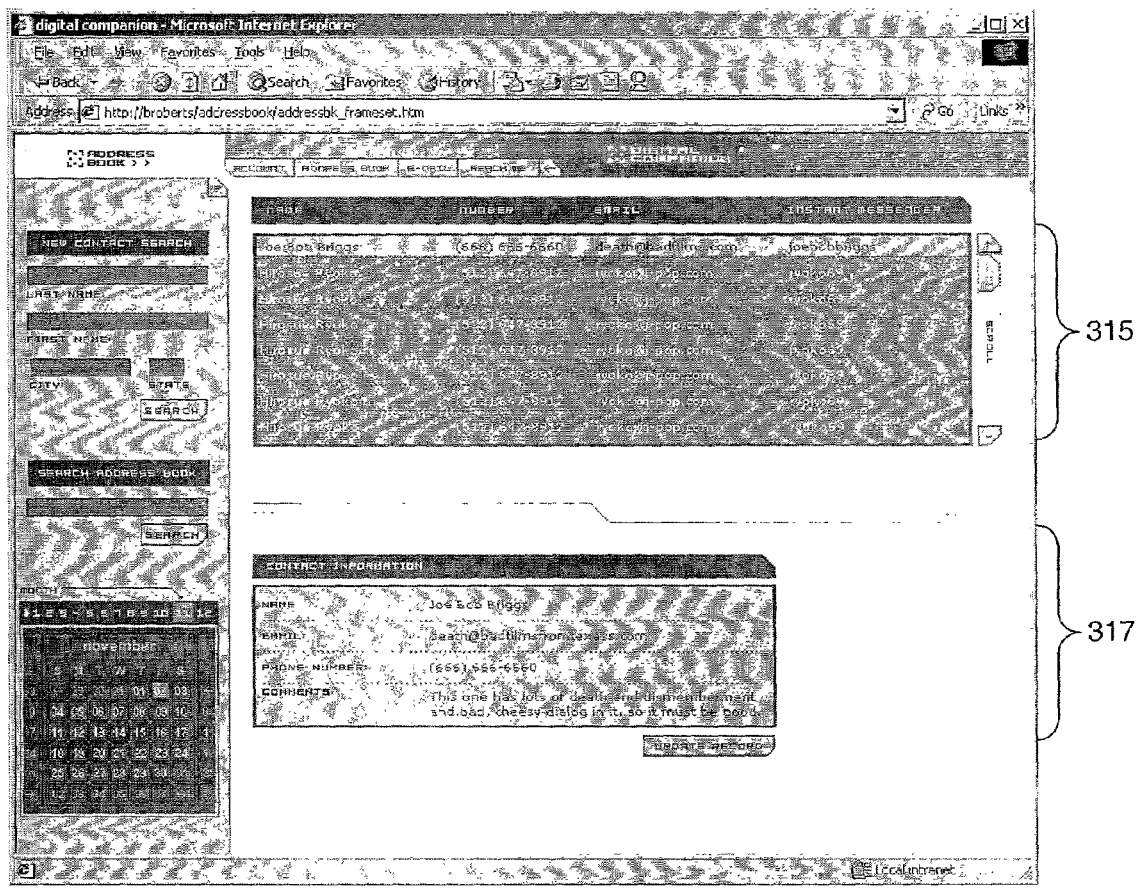

As shown in FIG. 3c, the screen shot shows a user interface for an address book. The screen shot shows an address list portion 315 that lists contact information for the user. For example, the contact information may include "NAME", "ADDRESS", "EMAIL", and "INSTANT MESSENGER" information. The screen shot also shows a record information portion 317 that displays a specific record for a contact. The user has the option to "UPDATE" the record. The screen shows also provides a search window to search for contact information and a calendar.

Figure 3D:
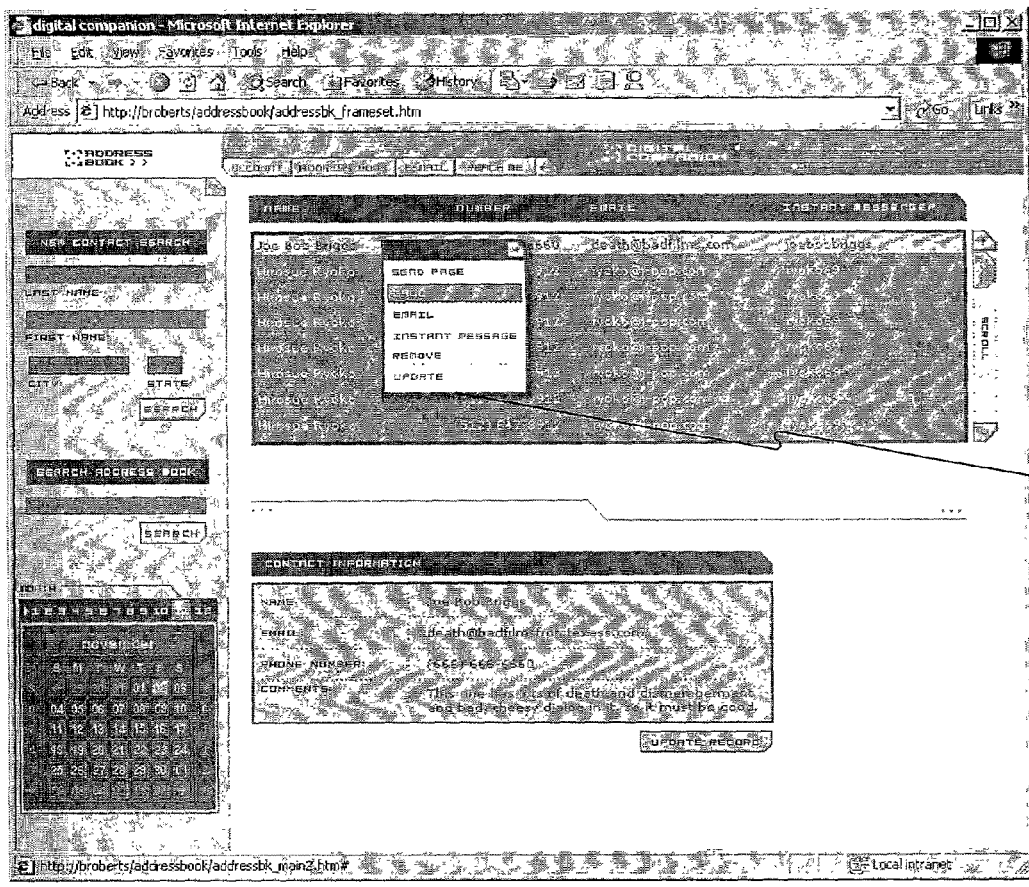

As shown in FIG. 3d, the screen shot shows the user interface of FIG. 3c with a pull-down menu 320 that provides a number of options for a user to contact a selected person consistent with the present invention. For example, the user can contact the selected person using such options as "SEND PAGE", "CALL", "EMAIL", and "INSTANT MESSAGE". Pull-down menu 320 also provides a "REMOVE" and "UPDATE" option to modify contact information in the address book.

Figure 3E:
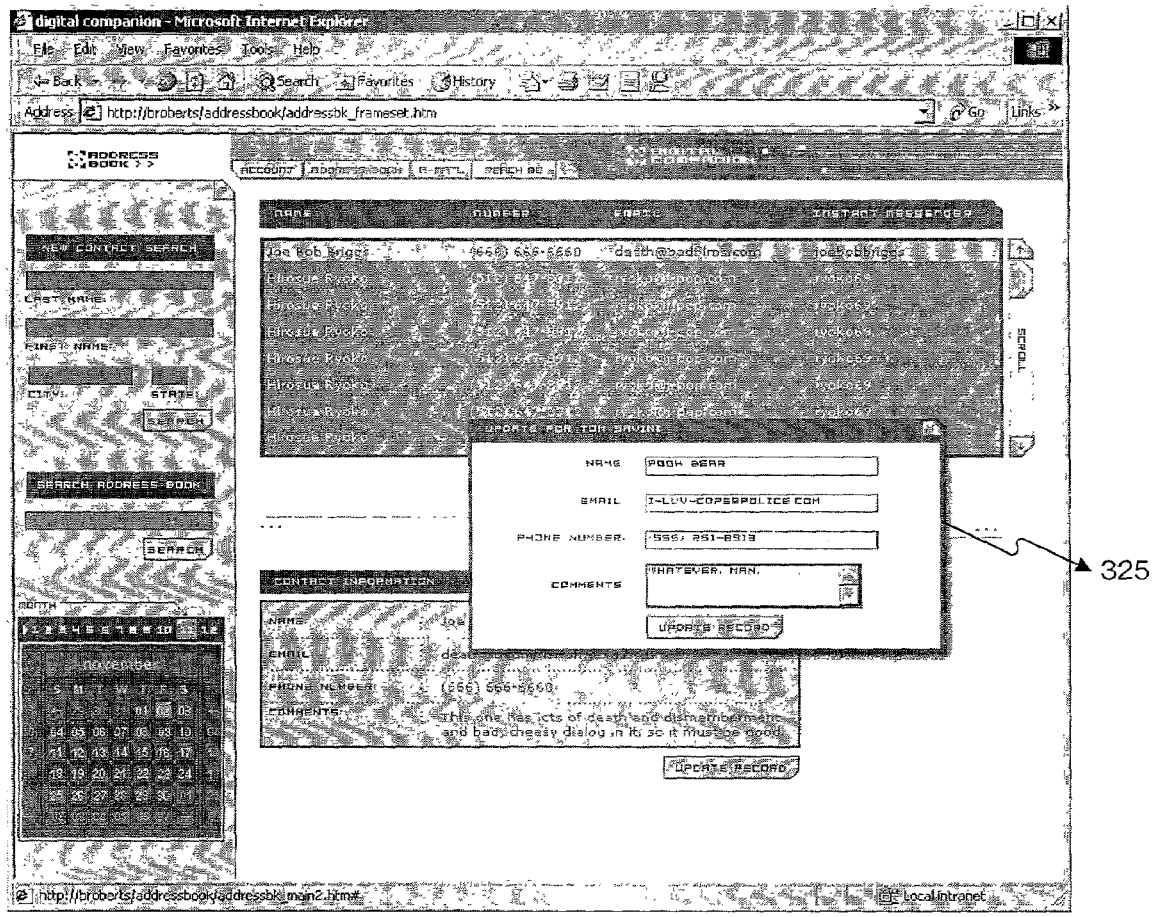

As shown in FIG. 3e, the screen shot shows the user interface of FIG. 3c with a pop-up window 325 that provides a number of inputs to modify contact information for a person in the address book. Pop-up window 325 is shown to update a record for "TOM SERVINI" using, e.g., "NAME", "EMAIL", and "PHONE NUMBER" inputs. Pop-up window 325 may also provide a "COMMENTS" window for the user to input a comment.

Figure 3F:
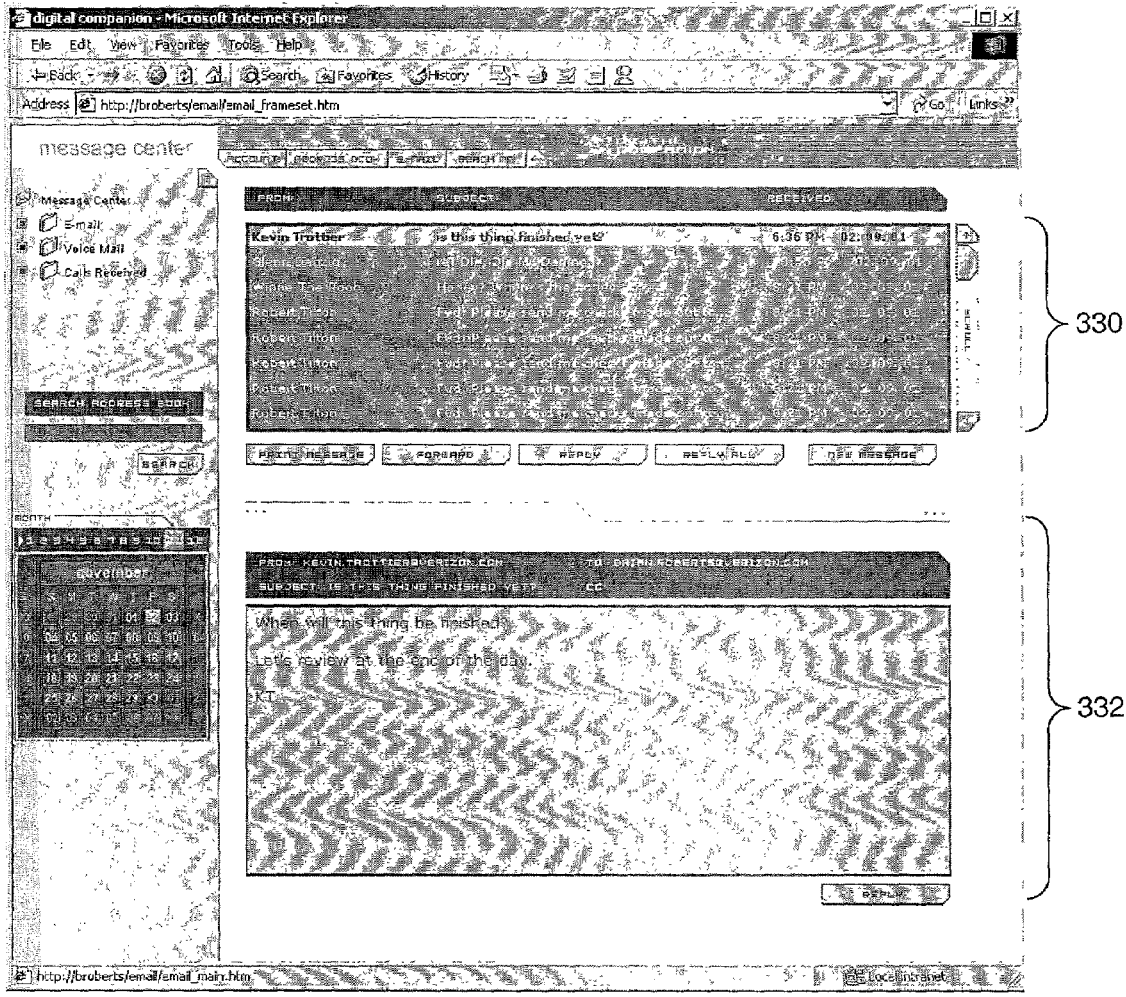

As shown in FIG. 3f the screen shot shows a user interface for a message center panel having a summary portion 330 that lists messages received in a "RECEIVED:" column, the subject of the received messages in a "SUBJECT:" column, and the name of the persons who sent the messages in a "FROM:" column. Summary portion 330 may also provide other types of information such as the date/time the message was received, the data size of the message, or an attachment indicator. Additionally, summary portion 330 may provide a summary of recent e-mails or instant messages received by the user. Summary portion 330 also provides a number of options to process the messages. For example, the user may select a "PRINT MESSAGE", "FORWARD", "REPLY", "REPLY ALL", or "NEW MESSAGE" option for the listed messages in summary portion 330. The screen shot also shows a detail view portion 332 that provides the details of a selected message. For example, the details of an email message from "KEVIN.TROTTIER" are shown. Detail view portion 332 also provides a "REPLY" option to reply to the viewed message.

Figure 3G:
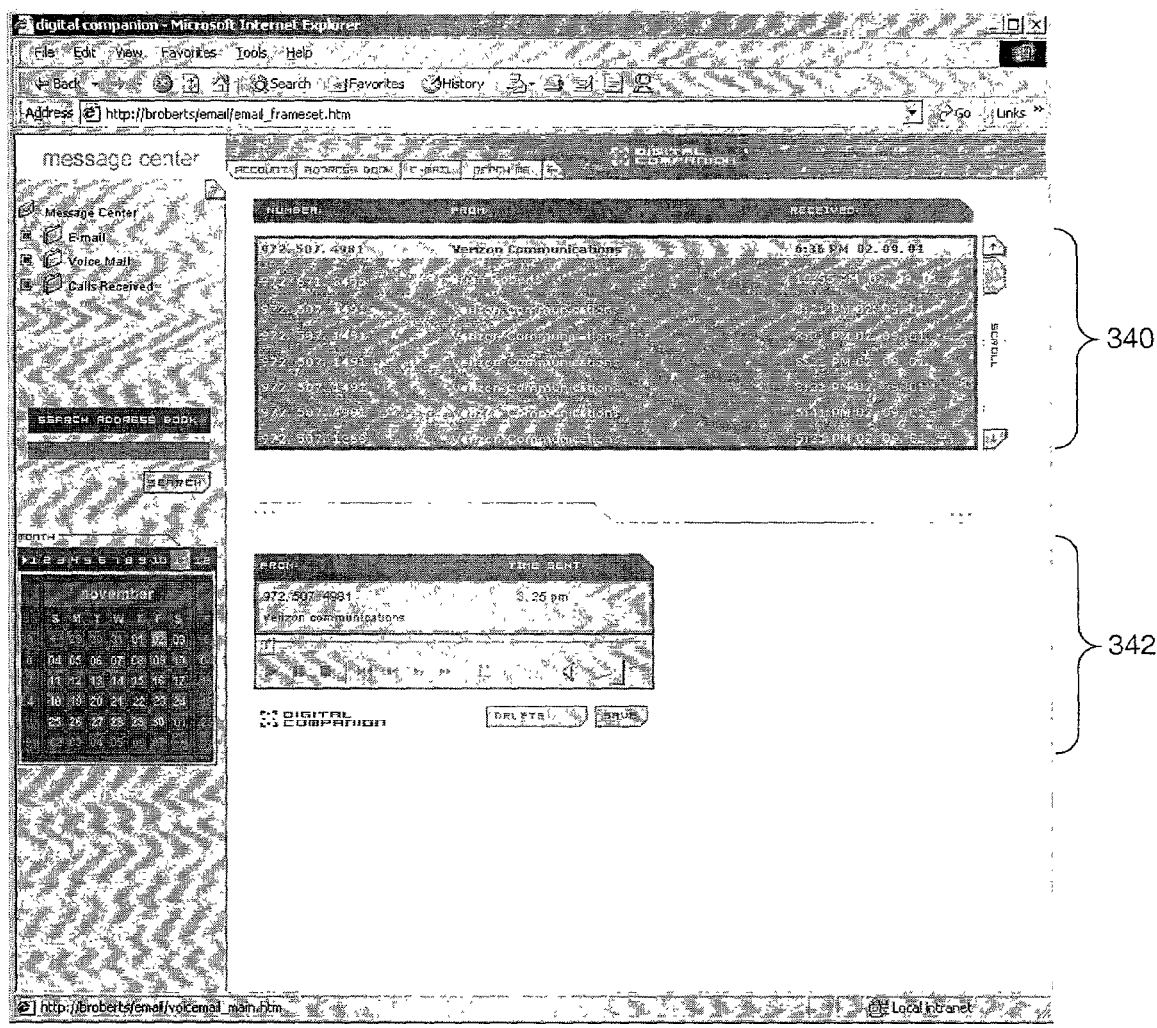

As shown in FIG. 3g, the screen shot shows a user interface for a message center panel having a summary portion 340, which is similar to summary portion 330 of FIG. 3f. Summary portion 340 provides summary information applicable to voice mails in a "NUMBER:", "FROM:" and "RECEIVED:" column. The screen shot also shows a detail portion 342 that allows a user to playback the voice message. Detail portion 342 also allows the user to "DELETE" or "SAVE" the voice message.

Figure 3H:
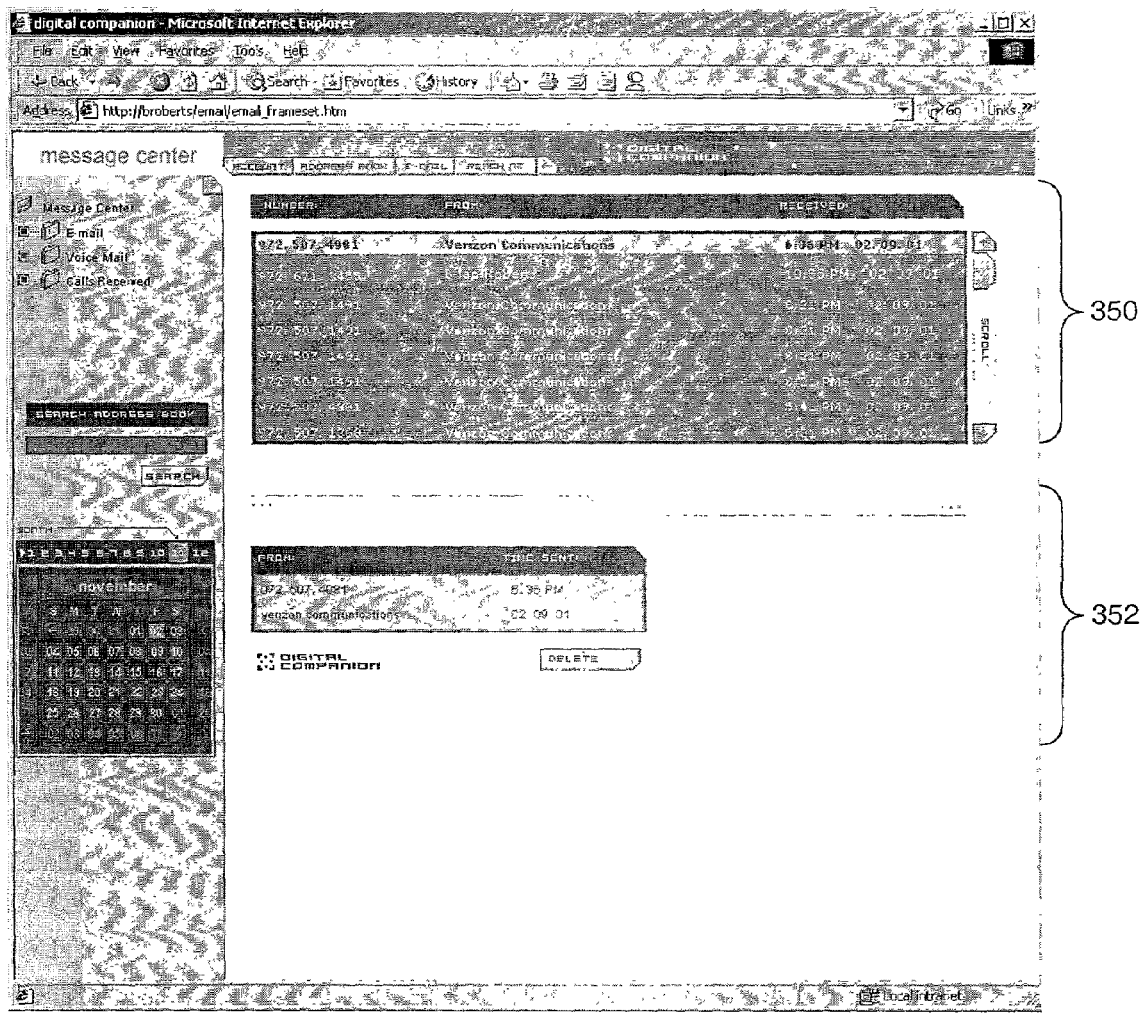
Figure 3I:
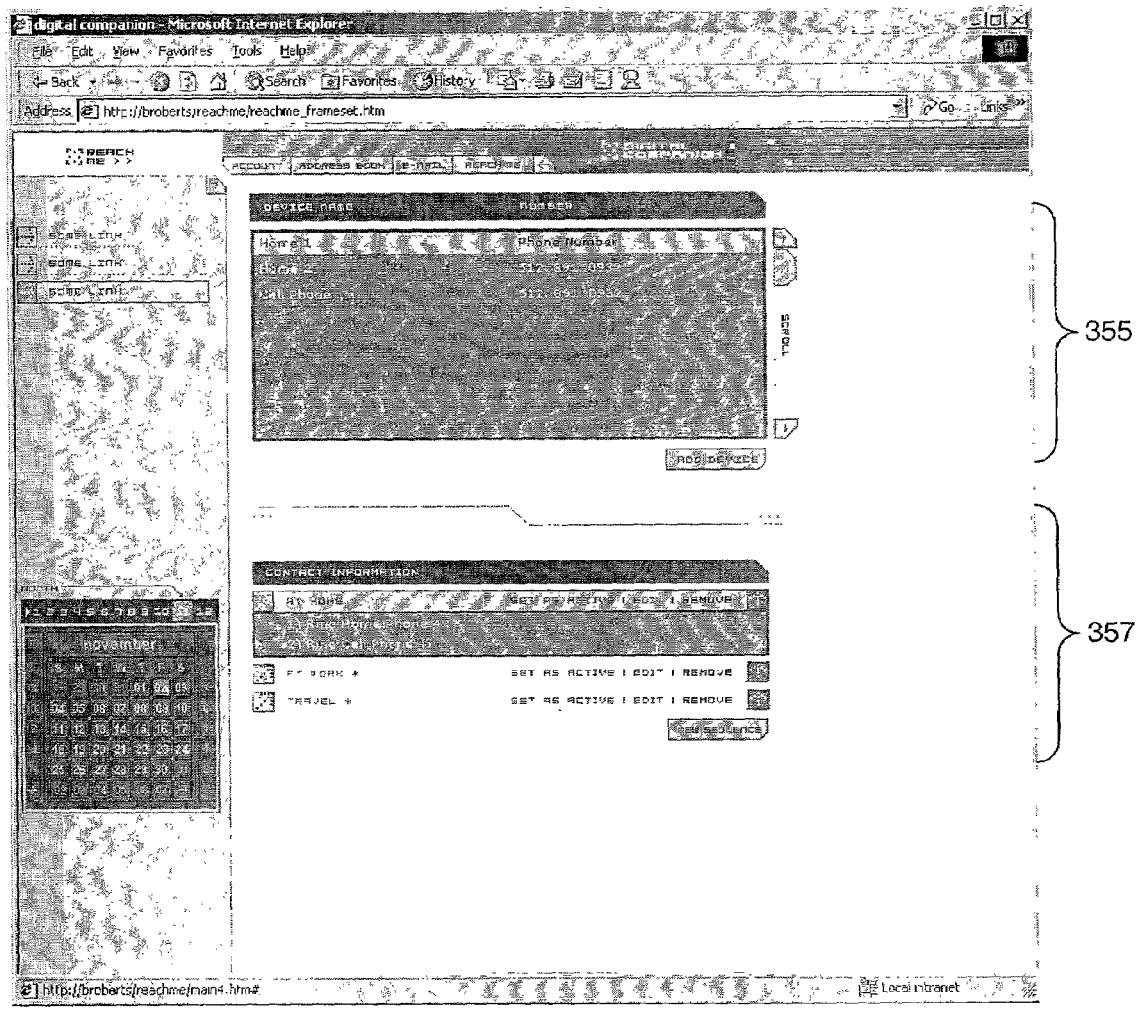

FIG. 3h shows a screen shot of a message center panel having a message summary list portion 350 that lists a summary of messages received. The screen shot also shows a message detail portion 352 that displays detail of a message. FIG. 3i shows a screen shot of a user interface having a device summary portion 355 that lists the devices in use by the user and a device detail portion 357 that allows the user to configure a particular device. For example, the user may configure the number of times to ring the "HOME 1" or "CELL PHONE" device.

Figure 3J:
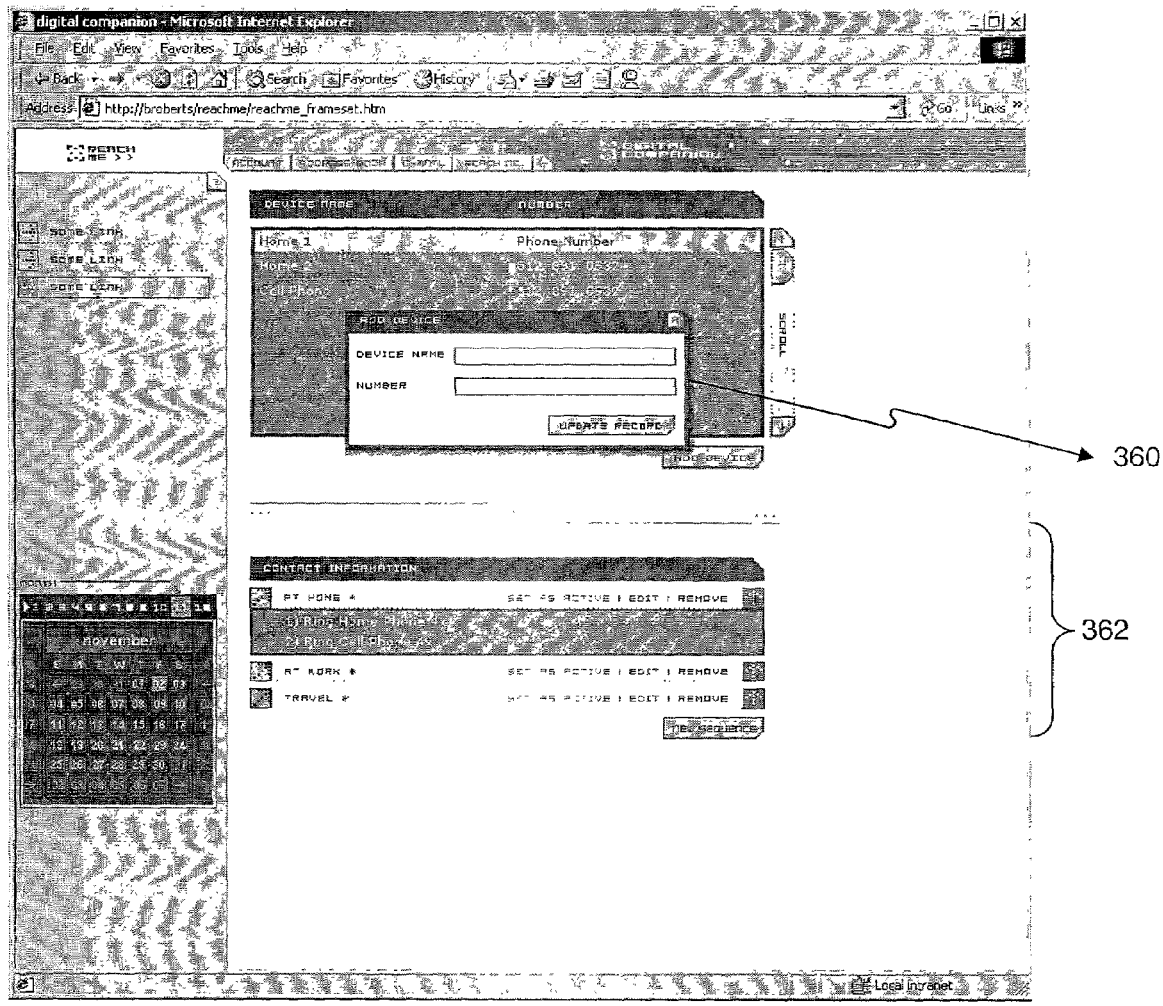
Figure 3K:
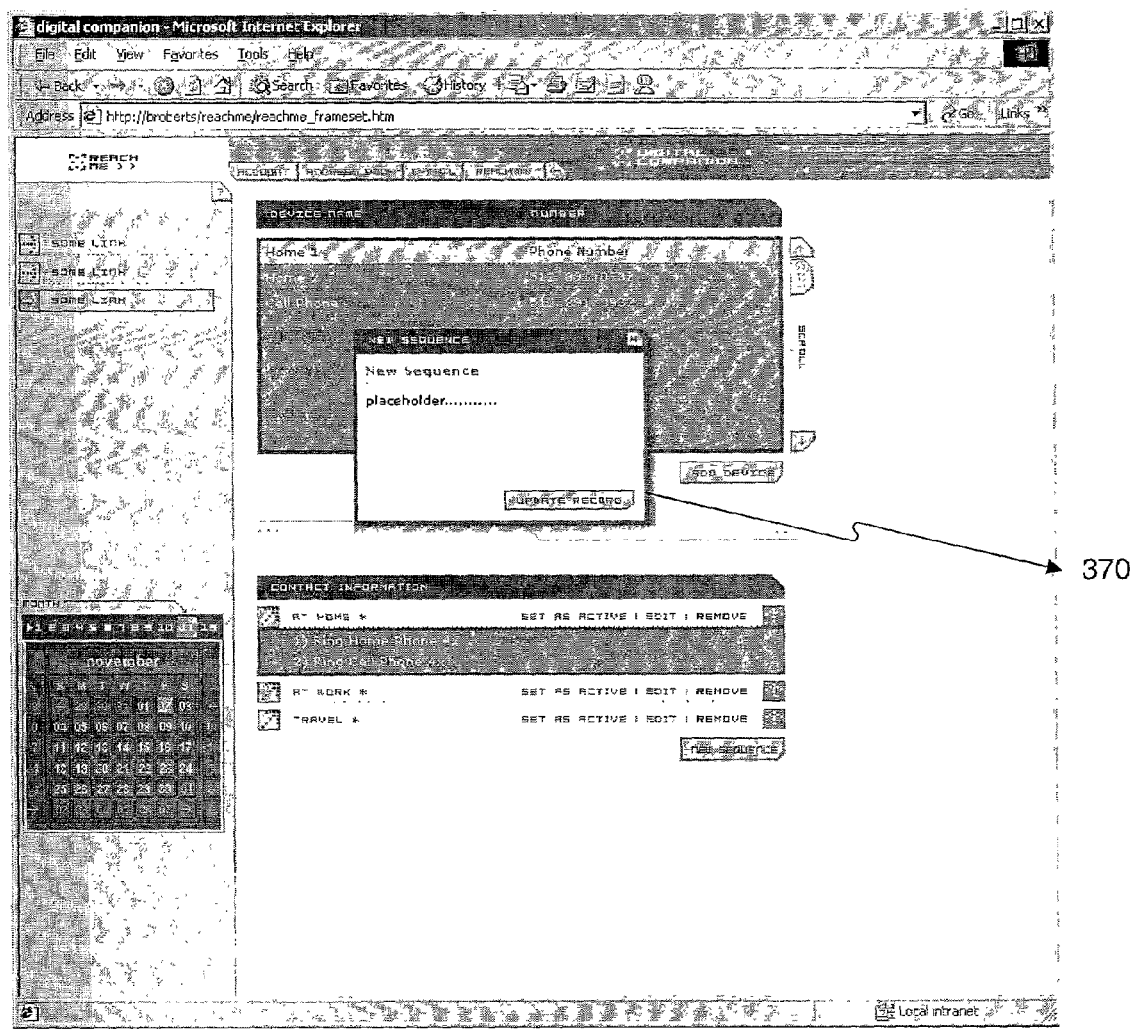
Figure 3I:
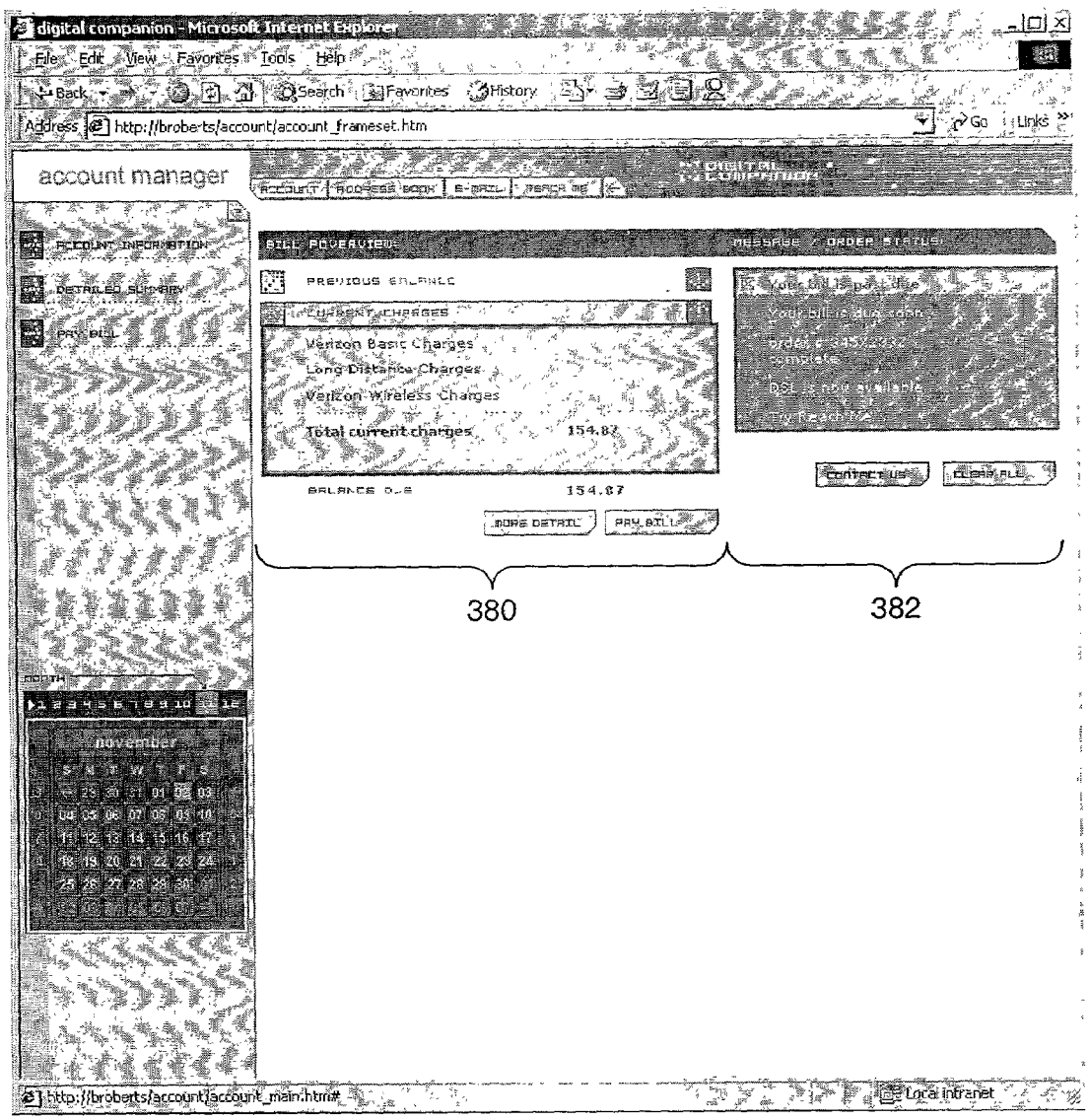

FIG. 3j shows a screen shot of the user interface of FIG. 3i having a pop-up window 360 for adding a device. The screen shot also shows a detail portion 362, which is similar to detail portion 357 of FIG. 3i. FIG. 3k shows a screen shot of the user interface of FIG. 3i having a pop-window 370 that provides an "UPDATE RECORD" option for a user to modify the sequence of devices being called.

FIG. 3l shows a screen shot of a user interface for account management having an overview portion 380 allow a user access to summary information regarding a user's account. For example, overview portion 380 a user to access "PREVIOUS BALANCE", "CURRENT CHARGES", "BASIC CHARGES", "LONG DISTANCE CHARGES", and "WIRELESS CHARGES" summary information. The screen shot also shows a message portion 382 displays messages regarding the user's account. For example, a message such as "Your bill is past due" can be displayed in message portion 382.

Figure 3M:
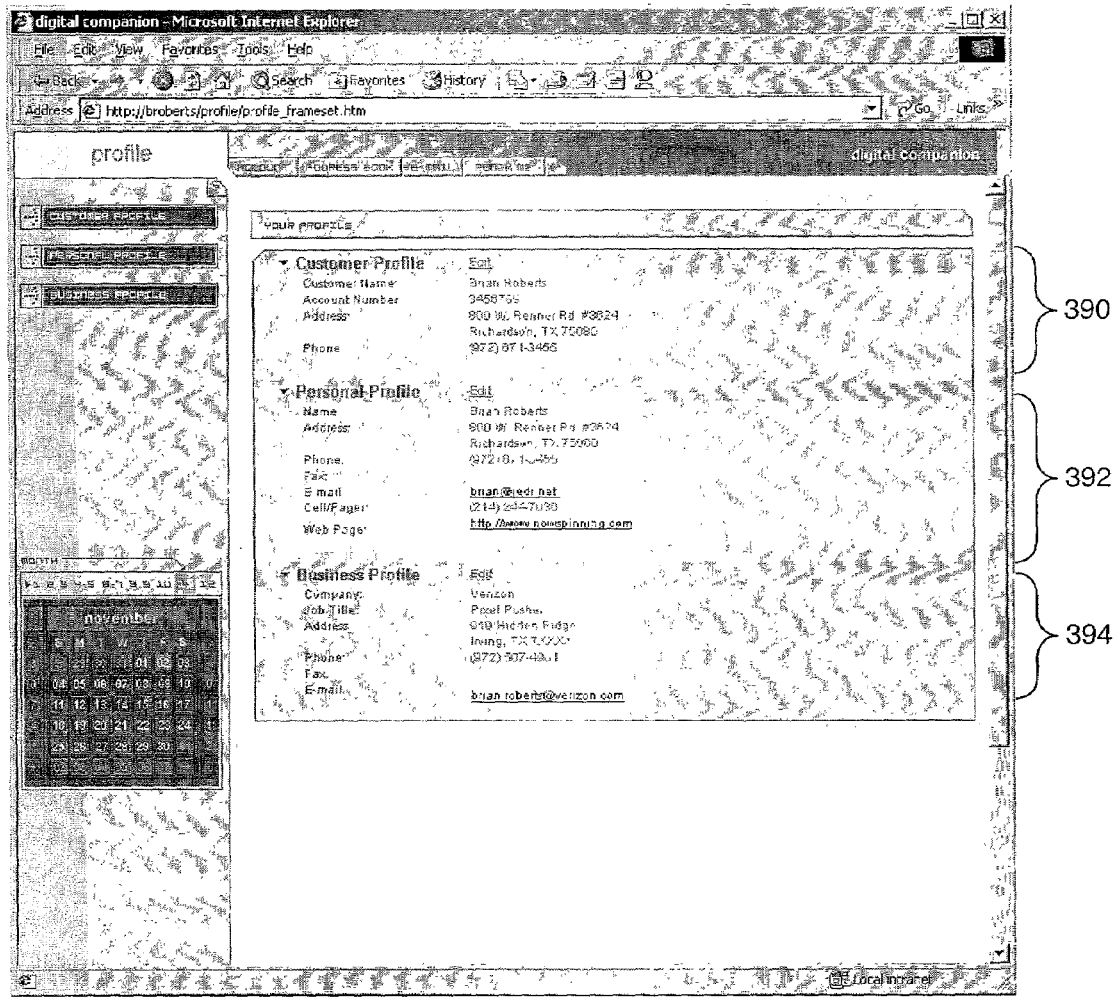

FIG. 3m shows a screen shot of a user interface for profile management having a customer profile portion 390, which displays a customer's profile. The customer's profile may include information such as "Customer Name:", "Account Number:", "Address" and "Phone:" information. The screen shot also shows a personal profile portion 392 that displays a user's personal profile. The personal profile may include "Name:", "Address", etc. information. The screen shot also shows a business profile portion 394 that displays a business profile. The business profile may include information such as "Company", "Job Title:" etc. information. These profiles can be kept confidential and updated to include any other type of profile information.

Figure 4:
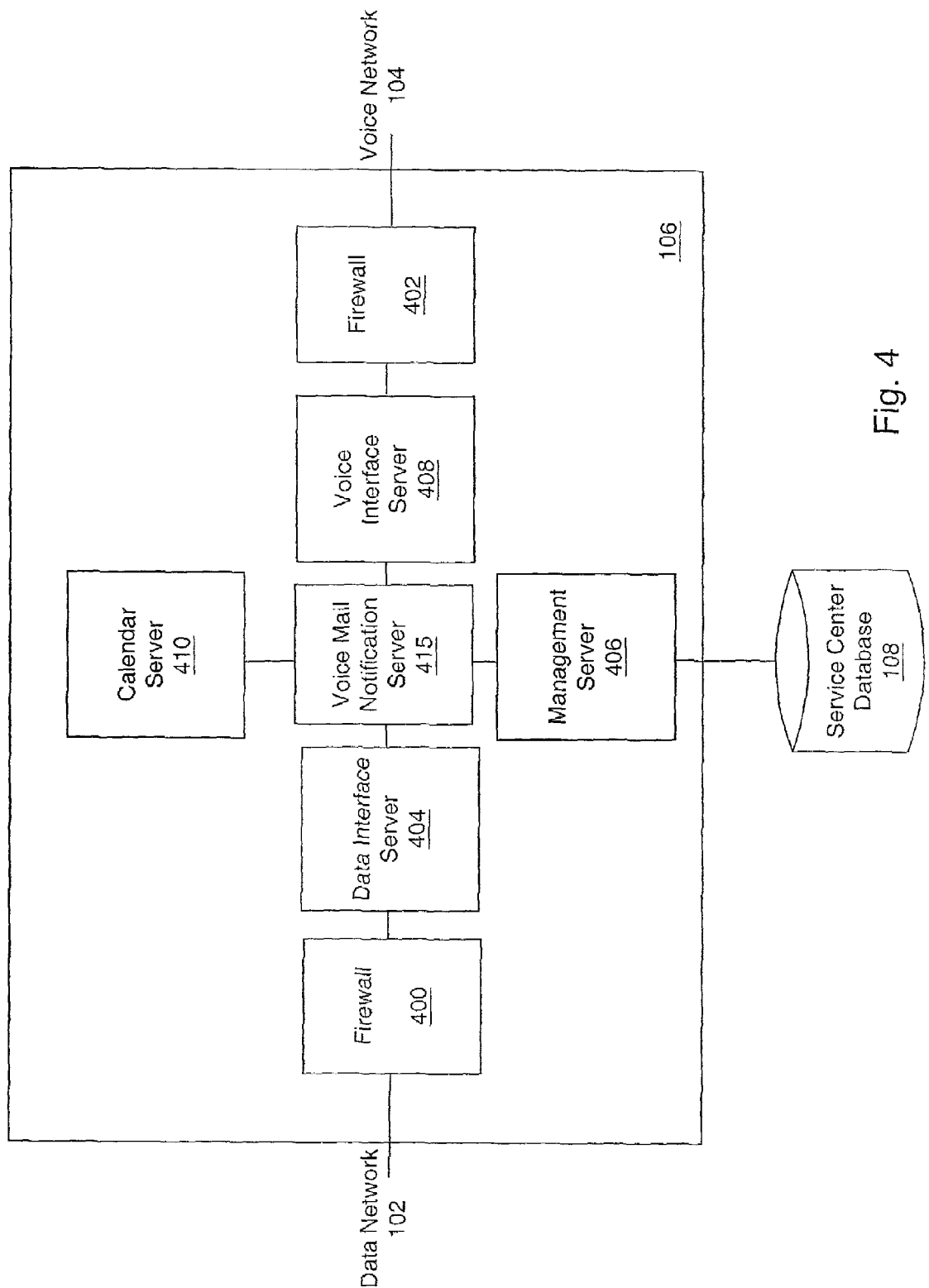
FIG. 4 is a block diagram of a service center, in accordance with methods and apparatus consistent with the principles of the present invention.

FIG. 4 is a block diagram of a service center, in accordance with methods and apparatus consistent with the principles of the present invention. Service center 106 is a gateway device, connecting voice network 104 to data network 102. As shown, service center 106 includes firewalls 400 and 402, a data interface server 404, a management server 406, a voice interface server 408, a calendar server 410, and a voice mail notification server 415.

Firewalls 400 and 402 provide security services for communications between service center 106, and data network 102, and between service center 106 and voice network 104, respectively. For example, firewalls 400 and 402 may restrict communications between user terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and user terminal 112. For example, data interface server 404 may exchange TCP/IP communications, such as IM communications or XML information which include call forwarding patterns from user 110. Data interface server 404 may also interface proxy 124 to indirectly exchange communications with user terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

Voice mail notification server 415 determines when a user receives a voice mail through voice network 104 via voice interface server 408. Voice mail notification server then notifies a user terminal on data network 102 of the voice mail using data interface server 404.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Calendar server 410 provides services to calendar application 220 on user terminal 112. For example, calendar server 410 may provide email services, directory services, and calendar information, such as schedule information, to user terminal 112. Calendar server 410 may operate in conjunction with data interface server 404 to exchange, for example, call forwarding patterns with user terminal 112.

Although FIG. 4 shows separate servers within service center 106, service center 106 may be implemented using any combination of hardware and software. For example, service center 106 may implement data interface server 404, management server 406, voice interface server 408, calendar server 410, and voice mail notification server 415 as software applications installed on a single machine. In addition, service center 106 may access one or more servers remotely across a network.

FIG. 5 is a data structure 500 used for voice mail notification, in accordance with methods and apparatus consistent with the principles of the present invention. Data structure 500 is shown as a table having a Time 520 column, a Date 522 column, a Caller ID 524 column, and an Audio File 526 column. Each row of data structure 500 represents a voice message record. For example, the first row of data structure 500 includes a record with "10:55 PM", "02.09.01", "Brian Roberts", and "voice1.wav" in the above columns. An audio file listed in the Audio File 526 column can be a .wav file, a MIDI file, or any other type of digital audio file.

Figure 6:
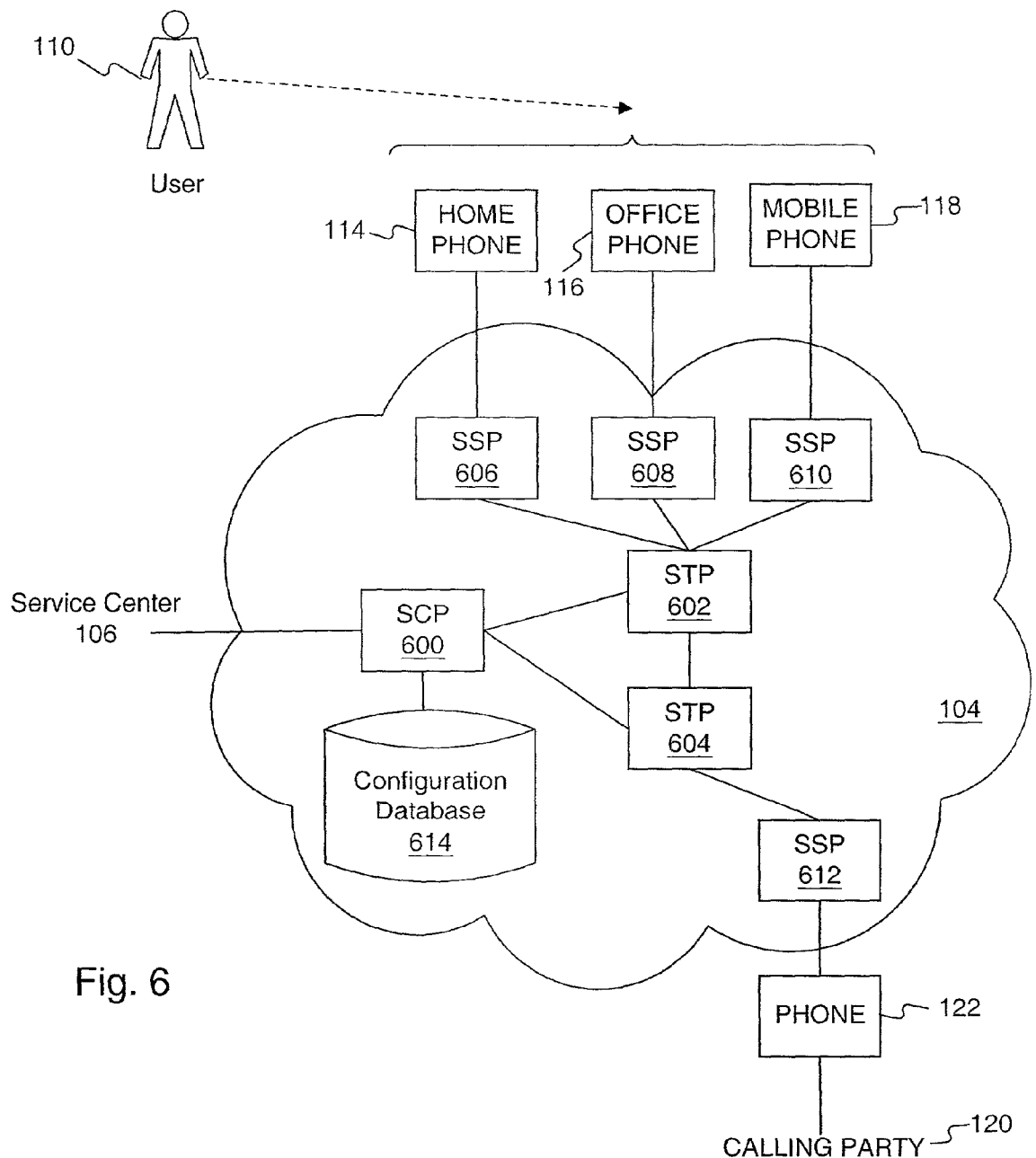
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services between voice interface server 408. SCP 600 provides translation and routing services of SS7 messages to support the features of voice network 104, such as call forwarding. In addition, SCP 600 may exchange information voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TCAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STPs 602 and 604 may route SS7 messages between SSPs 606, 608, 610, and 612. STP 602 and 604 may be integrated as adjunct to an SSP, e.g., SSPs 606, 608, 610, and 612, or may be implemented as a separate machine. In addition, STP 602 and 604 may provide security functions, such as security checks on incoming/outgoing SS7 messages. STPs 602 and 604 may also provide other functions, such as acquisition and storage of traffic/usage statistics. STPs 602 and 604 may be implemented using known hardware and software from manufacturers such as NORTEL™ and LUCENT Technologies™.

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 612 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
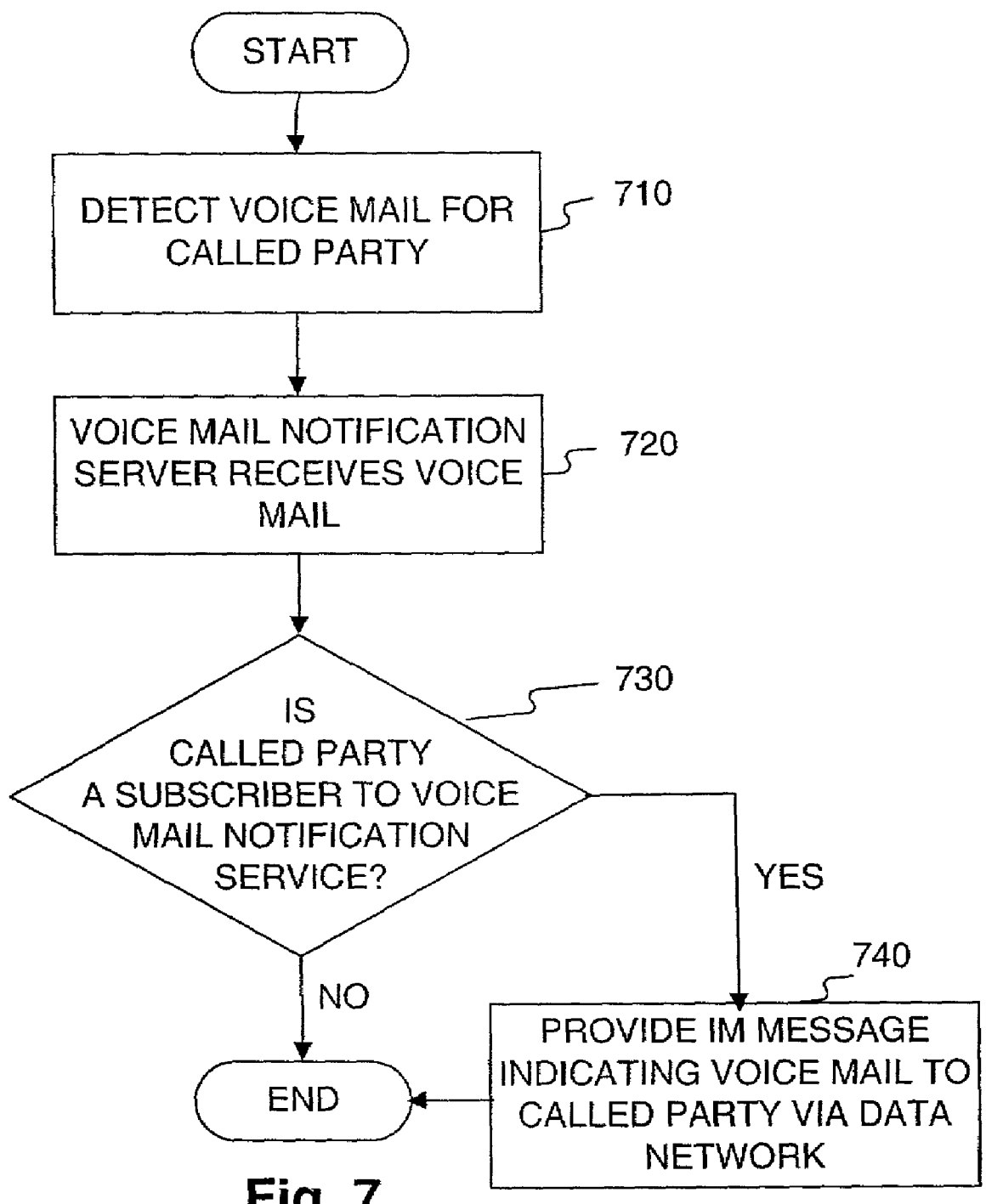
FIG. 7 is a flow diagram illustrating a method of providing voice mail alerts in accordance with methods and apparatus consistent with the principles of the present invention.

FIG. 7 is flow diagram illustrating a method of providing voice mail alerts consistent with the present invention. Voice network 104 detects a voice mail for a called party (step 710). A voice mail may be detected by configuring SSP 606 to trigger an alert to be sent to SCP 600 whenever a call is attempted to a user phone, such as phone 114, or whenever a voice mail is left at the voice mail server. Alternatively, service center 106 may monitor the SMDI of the voice mail server. In the event of a voice mail event, the voice mail server may send information, e.g., IP packets and XML information to service center 106 via the SMDI.

Voice mail notification server 415 receives a voice mail (step 720). The voice mail server may forward the voice mail information to the voice mail notification server 415, or may archive the voice mail information within service center database 108 and provide a notice to the voice mail notification server 415 of the archived voice mail.

Gateway device, i.e. service center 106, determines if the called party is a subscriber to voice mail notification service (step 730). If the called party is a subscriber to voice mail notification service, then service center 106 provides the called party access to the voice mail at the user terminal via an IM message (step 740). For example, voice notification server 415 may transmit the voice mail information to data interface server 404 using IM. Subsequently, data interface server 404 forwards the voice mail information within an IM message to user terminal 112 where it may be displayed or otherwise presented to called party 110. The voice mail information provided to the called party includes information from table 500, such as information time column 520 and date column 522, and information from caller ID column 524, and audio file 526.

Other embodiments of the invention will be apparent to those skilled in the art form consideration of the specification and practice of the invention disclosed herein. It is intended that the specification and examples be considered as exemplary only.

What is claimed is:

1. A method for alerting a called party of a voice mail from a calling party via a network comprising a telephone network, a data network, and at least one gateway device connected to both the telephone network and the data network, the method comprising:
   receiving a first message from an SCP in the telephone network at the at least one gateway device, the first message including an identifier of the calling party and the voice mail message;
   accessing a profile associated with the called party to identify a selected one of a plurality of instant messaging identifiers associated with the called party, the selected instant messaging identifier being selected based on rules for communication forwarding; and
   providing a second message in an instant messaging format including the calling party identifier and the voice mail message using the selected instant messaging identifier to the called party via the data network.

2. The method of claim 1, wherein the telephone network is a public switched telephone network.

3. The method of claim 1, wherein the telephone network is a wireless telephone network.

4. The method of claim 1, wherein providing the second message to the called party via the data network comprises providing the second message in an instant messaging format to a server in the data network associated with the called party, the server forwarding the second message in an instant messaging format to a user terminal of the called party.

5. A method for providing voice mail indication to a user in a system comprising a data network and a telephone network, the method comprising:
   receiving via the telephone network a voice mail for the user;
   storing the voice mail in the telephone network;
   sending a message from an SCP in the telephone network to a sewer connected to the data network, the message including the voice mail;
   storing the voice mail in a database in the data network;
   accessing a profile associated with the user to identify communication forwarding rules;
   notifying the user of the stored voice mail via the data network based on the communication forwarding rules.

6. The method of claim 5, further comprising:
   receiving a request from the user for accessing the voice mail.

7. The method of claim 5, further comprising:
   receiving a request from the user for manipulating the status of the voice mail.

8. The method of claim 7, wherein manipulating the status of the voice mail further comprises connecting to the telephone network and changing the voice mail status based on the request.

9. A system comprising:
   a telephone network configured to receive a voice message from a calling party to a called party;
   a data network configured to provide indication of the receipt of the voice message; and
   a gateway device, connected to both the telephone network and the data network, configured to:
   receive, via an SCP in the telephone network, a first message including the voice message and an indication of the calling party;

access a profile associated with the called party to identify called party communication forwarding rules; and provide a second message including the voice message and the indication of the calling party to the called party via the data network based on the called party communication forwarding rules.

10. The system of claim 9, wherein the called party communications forwarding rules direct the gateway device to provide the second message to the called party by providing the second message to a server in the data network associated with the called party.

11. The system of claim 9, wherein the called party communications forwarding rules direct the gateway device to provide the second message in an instant messaging format using an instant messaging identifier of the called party.

12. The method of claim 1, wherein the first message is an SS7 message.

13. The method of claim 1, further comprising:
determining if the called party is a subscriber to a voice mail notification service before providing the second message.

14. A system comprising:
a voice interface server connected to a voice network, and configured to communicate with an SCP in the voice network using SS7 formatted messages;
a data interface server connected to data network, and configured to communicate with a user terminal connected to the data network using IP formatted messages;
a voice mail notification server connected to the voice interface server and data interface server, and configured to both determine when a called party receives a voice mail through the voice network via the voice interface server and send a voice mail notification to the called party at the user terminal; and
a management server connected to the voice mail notification server, and configured to provide communication forwarding rules associated with the called party:
wherein, upon receipt of the voice mail in the voice network
the voice interface server receives a first message in SS7 format from the SCP, the first message including a calling party phone number and the voice mail, and sends the calling party phone number and the voice mail to the voice mail notification server;
the voice mail notification server sends the voice mail notification to the called party by sending a second message in IP format to the data interface server, the second message including the calling party phone number arid the voice mail; and
the data interface server forwards the second message in IP format to the user terminal based on the communication forwarding rules provided by the management server.

15. The system of claim 14, wherein the second message is in an instant messaging format.

* * * * *